(12) United States Patent
Lin

(10) Patent No.: US 12,225,877 B1
(45) Date of Patent: Feb. 18, 2025

(54) PET TOILET

(71) Applicant: Guangzhou Rongrong Pet Technology Co., Ltd., Guangzhou (CN)

(72) Inventor: Xianxin Lin, Guangdong (CN)

( * ) Notice: Subject to any disclaimer, the term of this patent is extended or adjusted under 35 U.S.C. 154(b) by 0 days.

(21) Appl. No.: 18/807,140

(22) Filed: Aug. 16, 2024

(30) Foreign Application Priority Data

Aug. 17, 2023 (CN) .......................... 202322217805.9

(51) Int. Cl.
*A01K 1/01* (2006.01)
(52) U.S. Cl.
CPC .................................. *A01K 1/0114* (2013.01)
(58) Field of Classification Search
CPC .............................. A01K 1/0114; A01K 1/011
USPC ........................................................ 119/161
See application file for complete search history.

(56) References Cited

U.S. PATENT DOCUMENTS

| | | | |
|---|---|---|---|
| 8,757,094 B2* | 6/2014 | Baxter | A01K 1/011 119/168 |
| 11,963,512 B1* | 4/2024 | Tang | A01K 1/0114 |
| 12,075,750 B2* | 9/2024 | Zhou | A01K 1/0114 |
| 2002/0139312 A1* | 10/2002 | Reitz | A01K 1/0114 119/165 |
| 2008/0017123 A1* | 1/2008 | Chin | A01K 1/011 119/166 |
| 2021/0267158 A1* | 9/2021 | Ma | A01K 1/011 |
| 2022/0142114 A1* | 5/2022 | Baxter | A01K 1/0052 |

FOREIGN PATENT DOCUMENTS

| | | | |
|---|---|---|---|
| CN | 115836649 A | 3/2023 | |
| CN | 115918552 A | 4/2023 | |
| CN | 117016398 A | * 11/2023 | ........... A01K 1/0114 |

OTHER PUBLICATIONS

A pet toilet; Lin et al. (Year: 2023).*

* cited by examiner

Primary Examiner — Yvonne R Abbott-Lewis

(57) ABSTRACT

A pet toilet, including a main body, a separation body, an inner liner, and a screen assembly. The main body has a first accommodating space facing upwards and defines a discharge port and a first inlet. The separation body is rotatably and detachably arranged on the main body. The separation body is rotatable in the first accommodating space. The separation body has a second accommodating space and defines a second inlet that is in communication with the second inlet. A shape of the inner liner is the same as a shape of the separation body, and the inner liner is detachably arranged on the separation body. A lower part of the screen assembly is arranged in the second accommodating space, dividing the second accommodating space into a first litter bin and a second litter bin. An upper part of the screen assembly is detachably arranged on the separation body.

12 Claims, 10 Drawing Sheets

PET TOILET

CROSS REFERENCE

The present application claims foreign priority of Chinese Patent Applications No. 202322217805.9, field on Aug. 17, 2023, the entire contents of which are hereby incorporated by reference.

TECHNICAL FIELD

The present disclosure relates to the technical field of pet supplies, and more specifically to a pet toilet.

BACKGROUND

Existing pet toilets have the following common features in their waste separation and transmission structures:
1. Complete cylindrical or spherical shape, enclosed structure, large size;
2. A waste separation baffle divides the interior into two spaces, and the separation baffle is not detachable;
3. The separation structure has obvious a gear transmission feature and a garbage discharge outlet feature;
4. Holes and grooves are required to support and drive the separation structure, for mounting a support roller and a drive roller;
5. The separation structure rotates back and forth to discharge the waste from the drum. During which the waste rolls randomly within the separation structure.

Therefore, the common features of the above existing pet toilets lead to the following common problems: the separation structure has holes and grooves on a direct lower side, which causes the waste to enter the interior of the device and cannot be cleaned by the user; further, the separation structure becomes very dirty during use, and it is a poor experience to clean and maintain the separation structure.

In summary, based on the above problems, the existing pet toilets have the defect of being difficult to clean inside.

SUMMARY OF THE DISCLOSURE

In order to solve the above problems, the present disclosure provides a pet toilet to solve the problems raised in the above background technology.

In a first aspect, the present disclosure provides a pet toilet, including:
a main body, having a first accommodating space facing upwards and defining a discharge port and a first inlet that are each in communication with the first accommodating space; wherein the discharge port is disposed below the first accommodating space, and the first inlet is disposed on a side wall of the main body;
a separation body, of an open bowl-shaped structure; wherein the separation body is rotatably and detachably arranged on the main body; the separation body is disposed and rotatable in the first accommodating space; the separation body has a second accommodating space and defines a second inlet that is in communication with the second inlet; the first inlet and the second inlet are in a same direction to form a toilet entrance.
an inner liner; wherein a shape of the inner liner is the same as a shape of the separation body; the inner liner is detachably arranged on the separation body, and an outer surface of the inner liner completely covers an inner surface of the second accommodating space; and
a screen assembly; wherein a lower part of the screen assembly is arranged in the second accommodating space, dividing the second accommodating space into a first litter bin and a second litter bin; an upper part of the screen assembly extends perpendicular to the lower part of the screen assembly 40, and the upper part of the screen assembly is detachably arranged on the separation body; an upper part of the first litter bin is closed, and the toilet entrance is in communication with the second litter bin.

In some embodiments, a first drive shaft is arranged on a side of the main body opposite to the first inlet; the first drive shaft is arranged in the first accommodating space, and the first drive shaft is engaged with a drive mechanism inside the main body for transmission; the first drive shaft defines a first mounting groove, and the main body is arranged with a support column and defines a pulley guide slot; the support column and the pulley guide slot are disposed in first accommodating space and are arranged close to first inlet;
a first connecting key is arranged on an outer surface of the separation body opposite to the second inlet, and the outer surface of the separation body defines a support column guide slot and is arranged with a pulley; the support column guide slot and the pulley are arranged close to the second inlet; the first connecting key is arranged in the first mounting groove, the support column is arranged in cooperation with the support column guide slot, and the pulley guide slot is arranged in cooperation with the pulley; the separation body is rotatable in the first accommodating space under a drive of the main body, and a rotation axis of the separation body is parallel to an entry direction of the toilet entrance.

In some embodiments, a second drive shaft is arranged on each of opposite sides of the main body, and two the second drive shafts are disposed in the first accommodating space and are both adjacent to the first inlet; each of the two second drive shafts is engaged with a drive mechanism inside the main body for transmission; each of the two second drive shafts defines a second mounting groove;
a second connecting key is arranged on an outer surface of the separation body on each of opposite sides, and two the second connecting keys are arranged adjacent to the second inlet; each of the two second connecting keys is arranged on a corresponding second drive shaft, and the separation body is rotatable in the first accommodating space under a drive of the main body; a rotation axis of the separation body is perpendicular to an entry direction of the toilet entrance.

In some embodiments, an inner surface of the separation body is arranged with a plurality of first mounting columns, and the plurality of first mounting columns are disposed in the first accommodating space; the outer surface of the inner liner defines a plurality of first mounting holes, and the plurality of first mounting columns are arranged in a one-to-one correspondence with the plurality of first installation holes; or,
an adhesive point is arranged on an inner surface of the separation body, and the outer surface of the inner liner has a fitting surface; the separation body and the inner liner are bonded together through the adhesive point; or,
an inner surface of the separation body and the outer surface of the inner liner are bonded together by a double-sided adhesive tape.

In some embodiments, the screen assembly includes a baffle and a perforated plate;

an upper portion of the screen assembly is the baffle, and a lower portion of the screen assembly is the perforated plate; the baffle and the perforated plate are arranged perpendicular to each other; the baffle is detachably arranged on the separation body, and the perforated plate is arranged in the second accommodating space, dividing the second accommodating space into the first litter bin and the second litter bin; a lower end of the perforated plate defines a plurality of perforations.

In some embodiments, the baffle is arranged with a plurality of snap fasteners, and the baffle is connected to the separation body through the plurality of snap fasteners; or, the baffle is arranged with a plurality of first magnetic attraction points, and the separation body is arranged with a plurality of second magnetic attraction points; the baffle and the separation body are connected through the plurality of first magnetic attraction points and the plurality of second magnetic attraction points; or, the baffle defines a plurality of second mounting holes, and the separation body is arranged with a plurality of second mounting columns corresponding to the plurality of second mounting holes on the baffle; the baffle and the separation body are connected through the plurality of second mounting holes being snapped to the plurality of second mounting columns.

In some embodiments, the main body is arranged with a bin compartment below, and the bin compartment is in communication with the first accommodating space through the discharge port.

In some embodiments, the pet toilet further includes a waste bin slidably arranged below the main body and disposed at a position of the bin compartment.

In some embodiments, an inner surface of the inner liner is arranged with a guide line.

In summary, the present disclosure provides a pet toilet, including a main body, a separation body, an inner liner, and a screen assembly. The main body has a first accommodating space facing upwards and defines a discharge port and a first inlet that are each in communication with the first accommodating space. The discharge port is disposed below the first accommodating space, and the first inlet is disposed on a side wall of the main body. The separation body is an open bowl-shaped structure, and the separation body is rotatably and detachably arranged on the main body. The separation body is disposed and rotatable in the first accommodating space. The separation body has a second accommodating space and defines a second inlet that is in communication with the second inlet, where the first inlet and the second inlet are in a same direction to form a toilet entrance. A shape of the inner liner is the same as a shape of the separation body, the inner liner is detachably arranged on the separation body, and an outer surface of the inner liner completely covers an inner surface of the second accommodating space. A lower part of the screen assembly is arranged in the second accommodating space, dividing the second accommodating space into a first litter bin and a second litter bin. An upper part of the screen assembly extends perpendicular to the lower part of the screen assembly, and the upper part of the screen assembly is detachably arranged on the separation body, such that an upper part of the first litter bin is closed, and the toilet entrance is in communication with the second litter bin. The separation body and the inner liner in the present disclosure are each adopted with an open bowl-shaped structure, such that the user can easily remove the separation body from the main body, and then remove the inner liner and the screen assembly from the separation body to replace the inner liner and clean the screen assembly, thereby easily completing the cleaning work. Therefore, the present disclosure solves the defect of the existing pet toilet, where its interior is inconvenient to clean.

Figure 1:
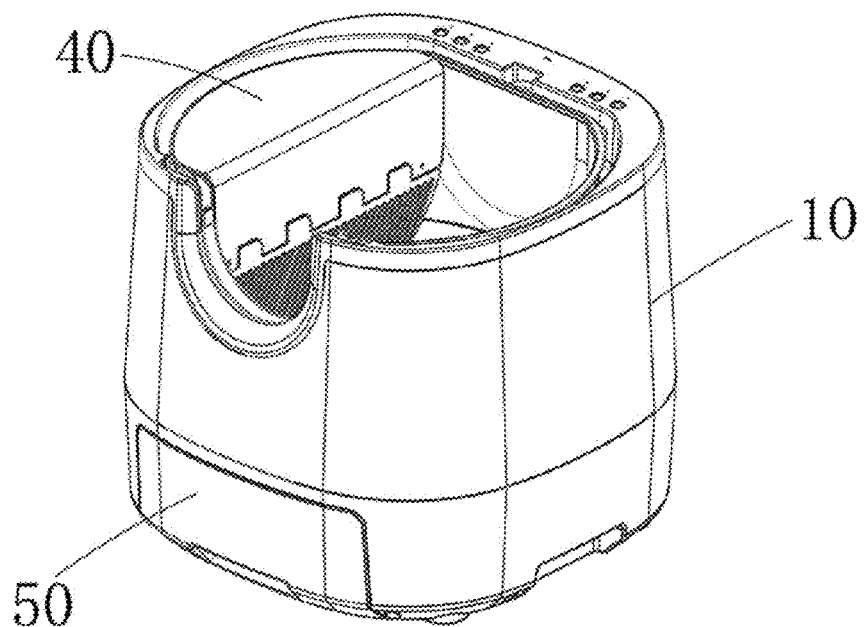
FIG. 1 is an overall structural schematic view of a first structure of a pet toilet according to the present disclosure.
Figure 2:
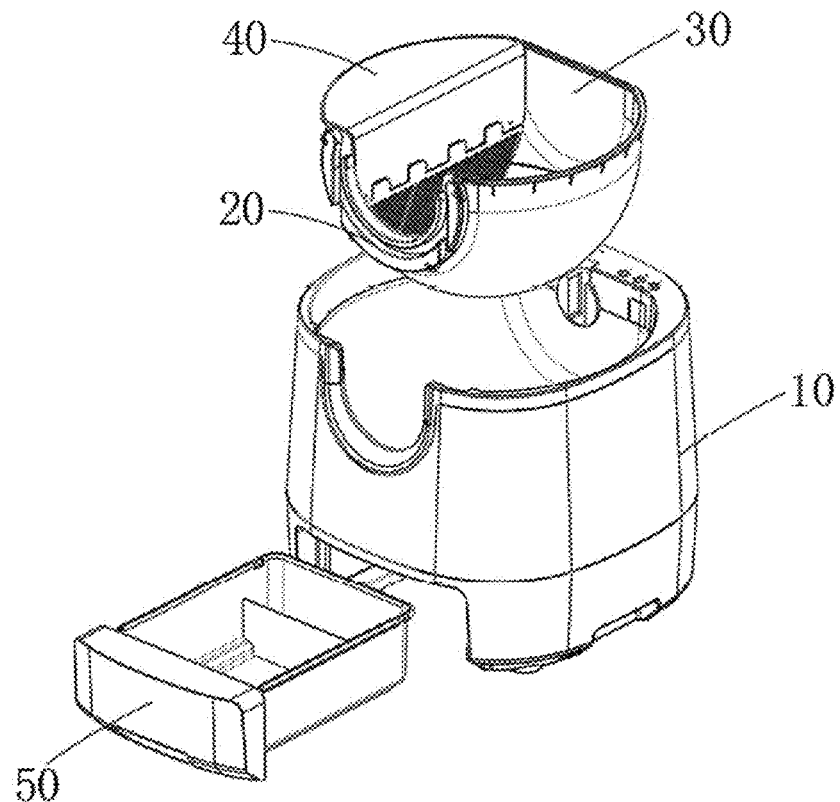
FIG. 2 is an overall exploded structural schematic view of a first structure of a pet toilet according to the present disclosure.
Figure 3:
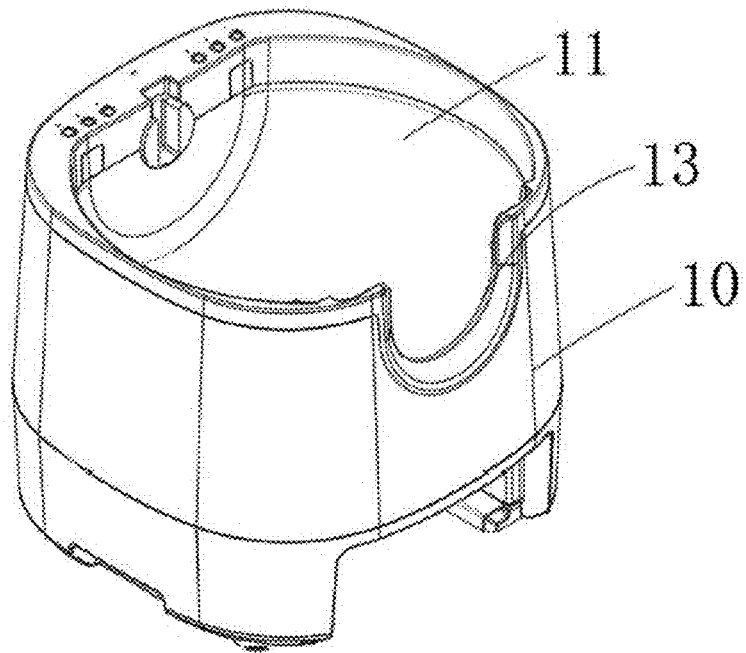
FIG. 3 is a perspective structural schematic view of a main body in a first structure of a pet toilet according to the present disclosure.

REFERENCE NUMERALS 10, main body; 11, first accommodating space; 12, discharge port; 13, first inlet; 14, first drive shaft; 140, first mounting groove; 15, support column; 16, pulley guide slot; 17, second drive shaft; 170, second mounting groove; 19, bin compartment; 20, separation body; 21, second accommodating space; 22, second inlet; 23, first connecting key; 24, support column guide slot; 25, pulley; 26, second connecting key; 27, first mounting column; 29, adhesive point; 3 0, inner liner; 31, first mounting hole; 32, fitting surface; 33, guide line; 40, screen assembly; 41, baffle; 42, perforated plate; 43, perforation; 44, snap fastener; 45, first magnetic attraction point; 46, second mounting hole; 50, waste bin.

DETAILED DESCRIPTION

In order to make the purpose, technical solution, and advantages of the present disclosure clearer, the following will further describe the implementation of the present disclosure in detail in combination with the drawings.

In the description of the present disclosure, it should be understood that the terms "center", "up", "down", "front", "back", "left", "right", "vertical", "horizontal", "top", "bottom", "inside", "outside" and other indications of orientation or position relationship is based on the orientation or position relationship shown in the drawings, and is only for the purpose of describing the present disclosure and simplifying the description, rather than indicating or implying that the device or component referred to must have a specific orientation, be constructed and operated in a specific orientation, and therefore cannot be understood as a limitation of the present disclosure.

In the description of the present disclosure, it is noted that, unless otherwise expressly provided and limited, the terms "mounted", "connected," and "coupled" should be broadly understood. For example, they may be fixed connections, removable connections, or integral connections; they may be mechanical connections or electrical connections; they may be direct connections or indirect connections through an intermediate medium; and they may be internal connections between two components. For those skilled in the art, the specific meaning of the above terms in the present disclosure can be understood in the specific context.

Referring to FIGS. 1 to 19, the present disclosure provides a pet toilet that may solve the defect of an existing pet toilet, where its interior is inconvenient to clean.

The present disclosure provides a pet toilet, including a main body 10, a separation body 20, an inner liner 30, and a screen assembly 40. The main body 10 has a first accommodating space 11 facing upwards and defines a discharge port 12 and a first inlet 13 that are each in communication with the first accommodating space 11. The discharge port 12 is disposed below the first accommodating space 11, and the first inlet 13 is disposed on a side wall of the main body 10. The separation body 20 is an open bowl-shaped structure, and the separation body 20 is rotatably and detachably arranged on the main body 10. The separation body 20 is disposed and rotatable in the first accommodating space 11. The separation body 20 has a second accommodating space 21 and defines a second inlet 22 that is in communication with the second inlet 22, where the first inlet 13 and the second inlet 22 are in a same direction to form a toilet entrance. A shape of the inner liner 30 is the same as a shape of the separation body 20, the inner liner 30 is detachably arranged on the separation body 20, and an outer surface of the inner liner 30 completely covers an inner surface of the second accommodating space 21. A lower part of the screen assembly 40 is arranged in the second accommodating space 21, dividing the second accommodating space 21 into a first litter bin and a second litter bin. An upper part of the screen assembly 40 extends perpendicular to the lower part of the screen assembly 40, and the upper part of the screen assembly 40 is detachably arranged on the separation body 20, such that an upper part of the first litter bin is closed, and the toilet entrance is in communication with the second litter bin.

The inner liner 30 may be made of a flexible material such as non-woven fabric, felt, melt-blown cloth, textile fiber, plastic film, etc., or may be made of a combination of multiple flexible materials by stitching, pressing, hot-pressing, or adhesive bonding. One or more materials, such as activated carbon deodorant, silver ion solution, and bacteriostatic agent, may be added to the inner liner 30 to make it capable of removing odors and bacteria from pet excrement.

In addition, the open bowl-shaped structure defined by the separation body 20 in the present disclosure may be an open bowl-shaped container that is close to a hemispherical shape, a semi-cylindrical shape, or a rectangular shape.

In addition, since an open bowl-shaped structure and a detachable relationship between components are adopted, the volume of the pet toilet may be reduced, thereby reducing the cost of production, reducing the cost of logistics and transportation, and improving the user experience.

The present disclosure provides a pet toilet, including a main body 10, a separation body 20, an inner liner 30, and a screen assembly 40. The main body 10 has a first accommodating space 11 facing upwards and defines a discharge port 12 and a first inlet 13 that are each in communication with the first accommodating space 11. The discharge port 12 is disposed below the first accommodating space 11, and the first inlet 13 is disposed on a side wall of the main body 10. The separation body 20 is an open bowl-shaped structure, and the separation body 20 is rotatably and detachably arranged on the main body 10. The separation body 20 is disposed and rotatable in the first accommodating space 11. The separation body 20 has a second accommodating space 21 and defines a second inlet 22 that is in communication with the second inlet 22, where the first inlet 13 and the second inlet 22 are in a same direction to form a toilet entrance. A shape of the inner liner 30 is the same as a shape of the separation body 20, the inner liner 30 is detachably arranged on the separation body 20, and an outer surface of the inner liner 30 completely covers an inner surface of the second accommodating space 21. A lower part of the screen assembly 40 is arranged in the second accommodating space 21, dividing the second accommodating space 21 into a first litter bin and a second litter bin. An upper part of the screen assembly 40 extends perpendicular to the lower part of the screen assembly 40, and the upper part of the screen assembly 40 is detachably arranged on the separation body 20, such that an upper part of the first litter bin is closed, and the toilet entrance is in communication with the second litter bin. The separation body 20 and the inner liner 30 in the present disclosure are each adopted with an open bowl-shaped structure, such that the user can easily remove the separation body 20 from the main body 10, and then remove the inner liner 30 and the screen assembly 40 from the separation body 20 to replace the inner liner 30 and clean the screen assembly 40, thereby easily completing the cleaning work. Therefore, the present disclosure solves the defect of the existing pet toilet, where its interior is inconvenient to clean.

Referring to FIGS. 1 to 10, in some embodiments, a first drive shaft 14 is arranged on a side of the main body 10 opposite to the first inlet 13. The first drive shaft 14 is arranged in the first accommodating space 11, and the first drive shaft 14 is engaged with a drive mechanism inside the main body 10 for transmission. The first drive shaft 14 defines a first mounting groove 140, and the main body 10 is arranged with a support column 15 and defines a pulley guide slot 16. The support column 15 and the pulley guide slot 16 are disposed in first accommodating space 11 and are arranged close to first inlet 13.

A first connecting key 23 is arranged on an outer surface of the separation body 20 opposite to the second inlet 22, and the outer surface of the separation body 20 defines a support column guide slot 24 and is arranged with a pulley 25. The support column guide slot 24 and the pulley 25 are arranged close to the second inlet 22. The first connecting key 23 is arranged in the first mounting groove 140, the support column 15 is arranged in cooperation with the support column guide slot 24, and the pulley guide slot 16 is arranged in cooperation with the pulley 25, such that the separation body 20 can rotate in the first accommodating space 11 under the drive of the main body 10, and the rotation axis of the separation body 20 is parallel to the entry direction of the toilet entrance.

In an initial state, an opening of the first mounting groove 140 faces upward such that the first connecting key 23 can be inserted into the first mounting groove 140, and an opening of the support column guide slot 24 faces downward such that the support column 15 can slide into the support column guide slot 24; the pulley 25 is supported and positioned by the pulley guide slot 16, and the support column 15 is in the support column guide slot 24, such that the movement of the separation body 20 is stable and reliable when it rotates in the first accommodating space 11 driven by the main body 10.

Referring to FIGS. 11 to 18, in some embodiments, the main body 10 is arranged with a second drive shaft 17 on each of opposite sides of the main body 10, and the two second drive shafts 17 are disposed in the first accommodating space 11 and are both adjacent to the first inlet 13. Each of the second drive shafts 17 is engaged with a drive mechanism inside the main body 10 for transmission. Each of the second drive shafts 17 defines a second mounting groove 170.

A second connecting key 26 is arranged on an outer surface of the separation body 20 on each of opposite sides, and the two second connecting keys 26 are arranged adjacent to the second inlet 22. The two second connecting keys 26 are arranged on the corresponding second drive shafts 17, respectively, such that the separation body 20 can rotate in the first accommodating space 11 under the drive of the main body 10, and the rotation axis of the separation body 20 is perpendicular to the entry direction of the toilet entrance.

The separation body 20 is connected and supported by the second connecting keys 26 and the second mounting grooves 170 on both sides, such that the separation body 20 is stable and reliable when rotating in the first accommodating space 11 driven by the main body 10.

Referring to FIGS. 6 to 9 or FIGS. 15 to 17, in some embodiments, an inner surface of the separation body 20 is arranged with multiple first mounting columns 27, and the multiple first mounting columns 27 are disposed in the first accommodating space 11. An outer surface of the inner liner 30 defines multiple first mounting holes 31, and the multiple first mounting columns 27 are arranged in a one-to-one correspondence with the multiple first installation holes 31, such that the outer surface of the inner liner 30 completely covers the inner surface of the second accommodating space 21.

Alternatively, an adhesive point 29 is arranged on the inner surface of the separation body 20, and the outer surface of the inner liner 30 has a fitting surface 32. The separation body 20 and the inner liner 30 are bonded together through the adhesive point 29, such that the outer surface of the inner liner 30 completely covers the inner surface of the second accommodating space 21.

Alternatively, the inner surface of the separation body 20 and the outer surface of the inner liner 30 are bonded together by double-sided adhesive tape, such that the outer surface of the inner liner 30 completely covers the inner surface of the second accommodating space 21.

The setting of the inner liner 30 plays a role in isolating dirt. In this way, the inner surface of the second accommodating space 21 of the separation body 20 is protected from contamination, thereby achieving the function of the separation body 20 being washable.

Referring to FIGS. 6 to 8 or FIGS. 15 to 16, in some embodiments, the screen assembly 40 includes a baffle 41 and a perforated plate 42.

An upper portion of the screen assembly 40 is the baffle 41, and a lower portion of the screen assembly 40 is the perforated plate 42. The baffle 41 and the perforated plate 42 are arranged perpendicular to each other. The baffle 41 is detachably arranged on the separation body 20, and the perforated plate 42 is arranged in the second accommodating space 21, dividing the second accommodating space 21 into a first litter bin and a second litter bin. A lower end of the perforated plate 42 defines multiple perforations 43.

The perforated plate 42 is arranged in the second accommodating space 21, dividing the second accommodating space 21 into the first litter bin and the second litter bin, where the first litter bin is configured to store clean pet litter when the separation body 20 is rotating, and the second litter bin is configured to lay pet litter and provide conditions for pets to defecate. Since the second litter bin is of an open structure facing upwards, the posture of the pet is not restricted when it defecates. The clean pet litter can enter the first litter bin through the multiple perforations 43 under a back-and-forth rotating motion of the separation body 20, and the pet litter that clumps to wrap the waster of the pet are screened out of the separation body 20 by the baffle 41 and the perforated plate 42. When it is required to clean up the litter, the clumps of pet litter will also roll randomly inside the separation body 20, but the clumps of pet litter will only come into contact with the screen assembly 40 and the inner liner 30 inside the separation body 20, such that the separation body 20 will no longer be contaminated.

Figure 19:
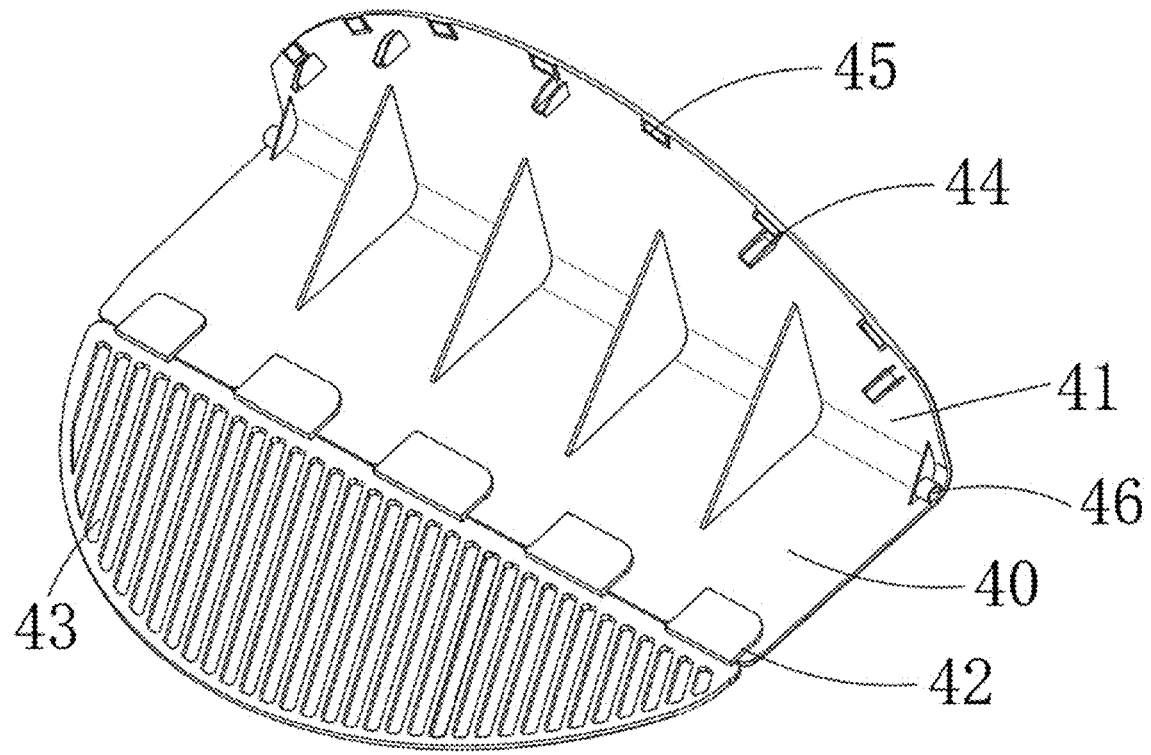
FIG. 19 is a structural schematic view of a screen assembly in each of a first structure and a second structure of a pet toilet according to the present disclosure.

Referring to FIG. 19, in some embodiments, the baffle 41 is arranged with multiple snap fasteners 44, and the baffle 41 is connected to the separation body 20 through the multiple snap fasteners 44.

Alternatively, the baffle 41 is arranged with multiple first magnetic attraction points 45, and the separation body 20 is arranged with multiple second magnetic attraction points. The baffle 41 and the separation body 20 are connected through the first magnetic attraction points 45 and the second magnetic attraction points.

Alternatively, the baffle 41 defines multiple second mounting holes 46, and the separation body 20 is arranged with multiple second mounting columns corresponding to the multiple second mounting holes 46 on the baffle 41. The baffle 41 and the separation body 20 are connected by the second mounting holes 46 being snapped to the second mounting columns.

In particular, when cleaning the pet toilet, the connection between the baffle 41 and the separation body 20 is easy to disassemble and assemble, thereby facilitating cleaning and maintenance by the user.

Figure 4:
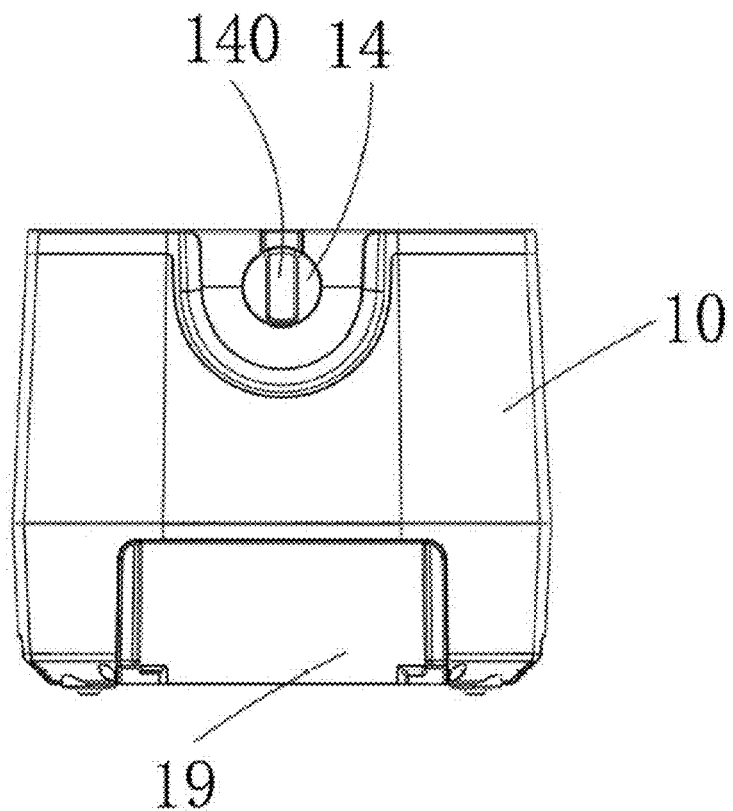
FIG. 4 is a front view of a main body in a first structure of a pet toilet according to the present disclosure.
Figure 5:
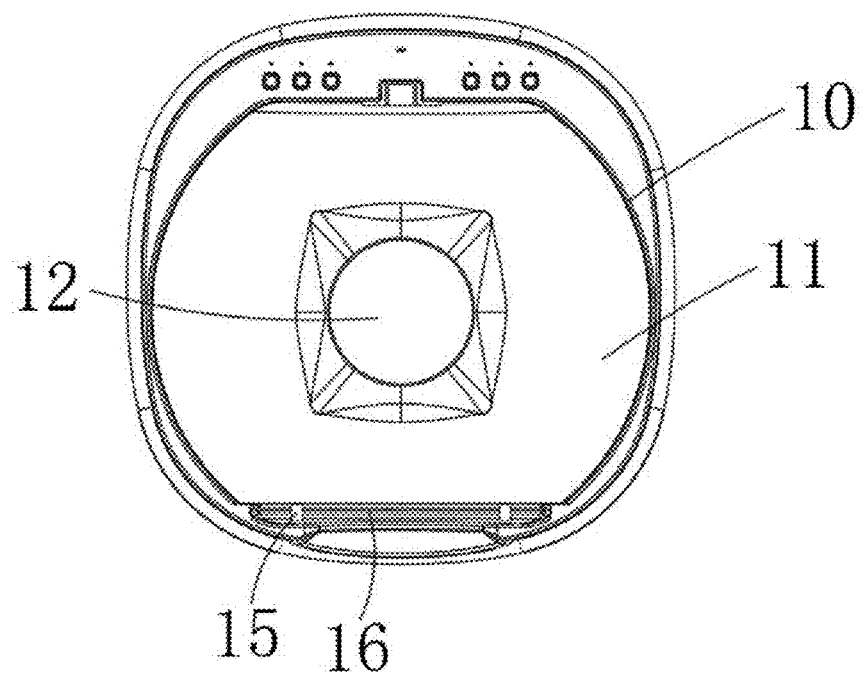
FIG. 5 is a top view of a main body in a first structure of a pet toilet according to the present disclosure.
Figure 6:
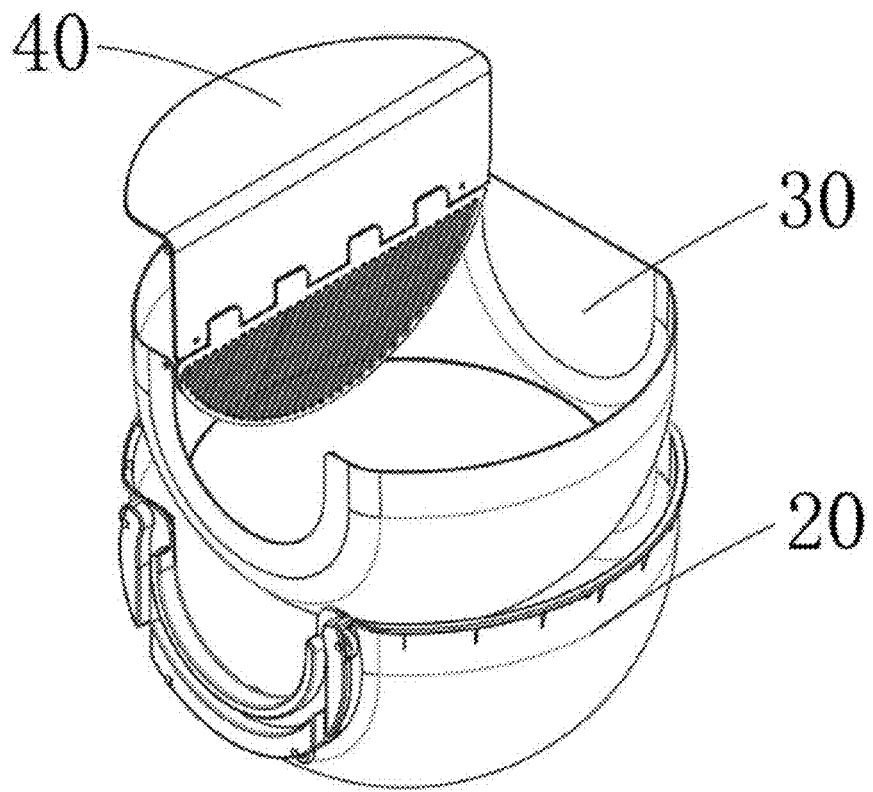
FIG. 6 is an exploded structural schematic view of a separation body, an inner liner, and a screen assembly in a first structure of a pet toilet according to the present disclosure.
Figure 7:
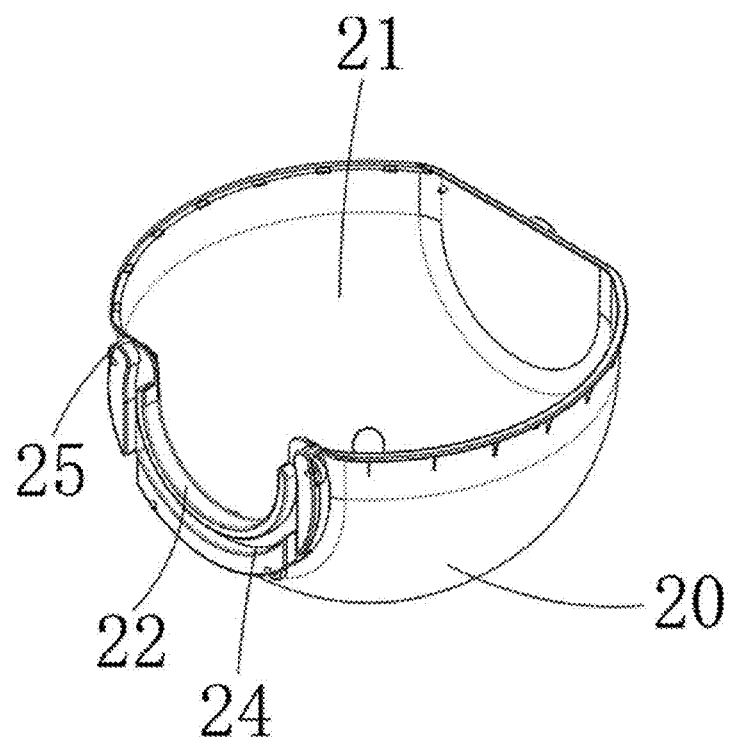
FIG. 7 is a structural schematic view of a separation body in a first structure of a pet toilet according to the present disclosure at a first viewing angle.
Figure 8:
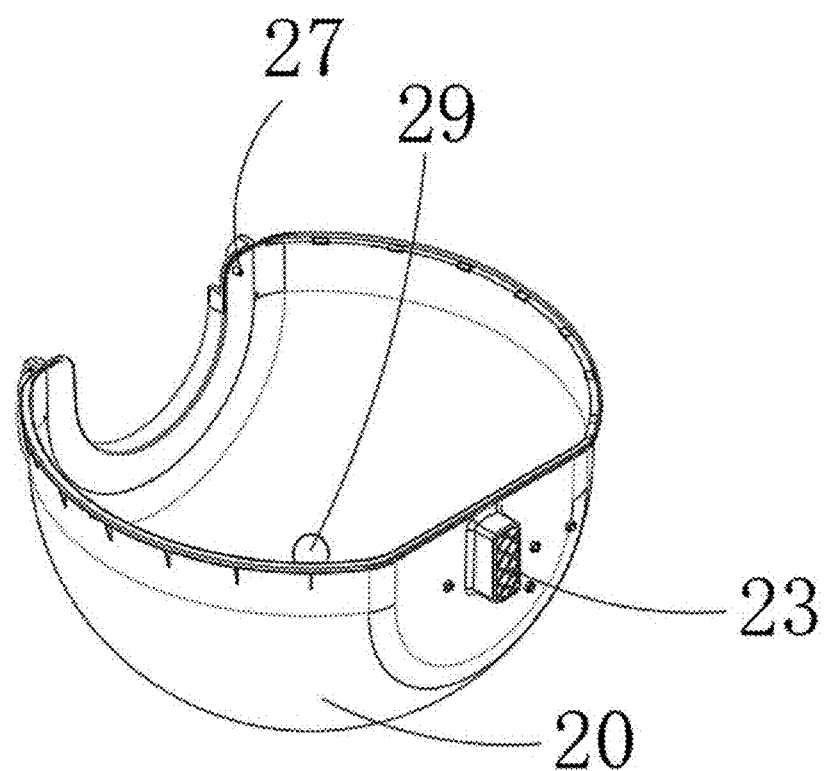
FIG. 8 is a structural schematic view of a separation body in a first structure of a pet toilet according to the present disclosure at a second viewing angle.
Figure 9:
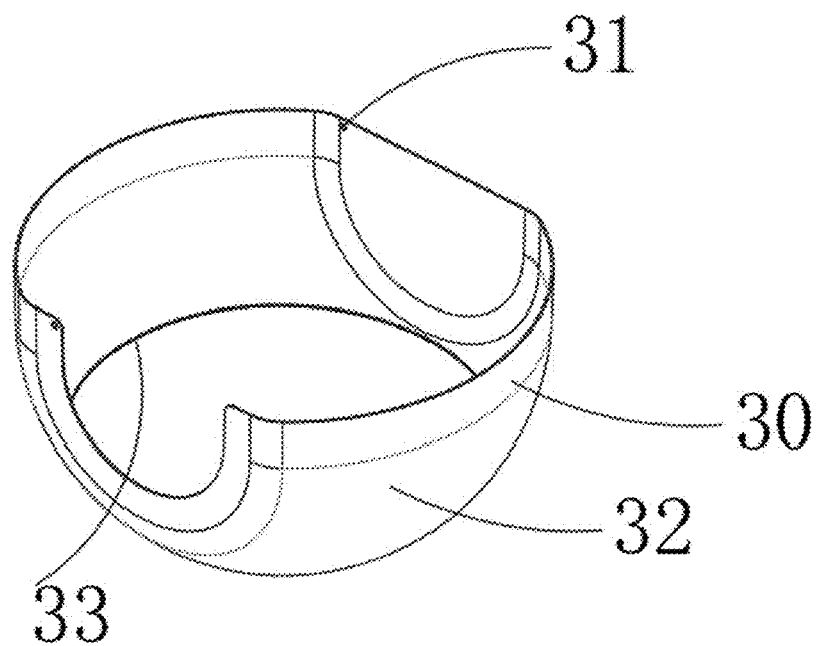
FIG. 9 is a structural schematic view of an inner liner in a first structure of a pet toilet according to the present disclosure.
Figure 10:
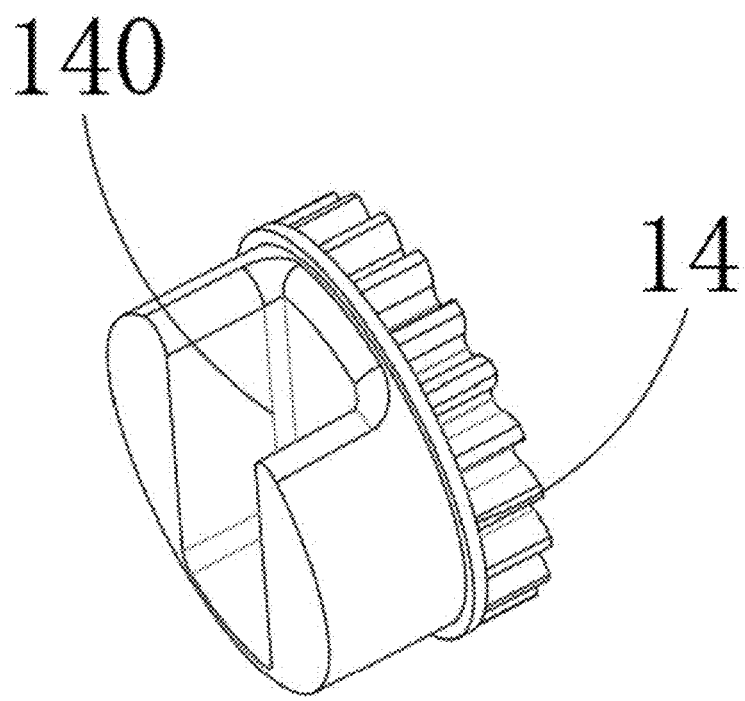
FIG. 10 is a structural schematic view of a first drive shaft in a first structure of a pet toilet according to the present disclosure.
Figure 11:
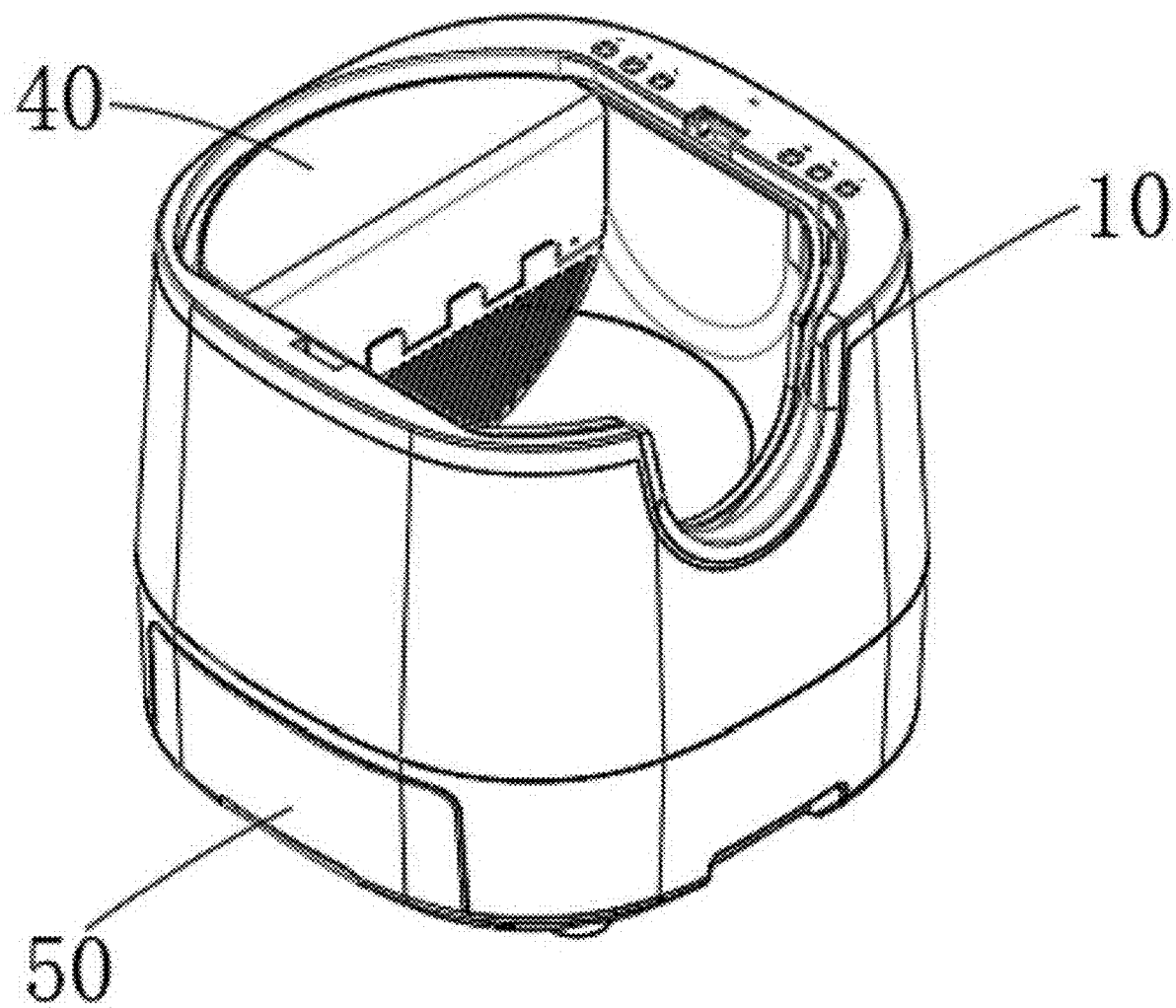
FIG. 11 is an overall structural schematic view of a second structure of a pet toilet according to the present disclosure.
Figure 12:
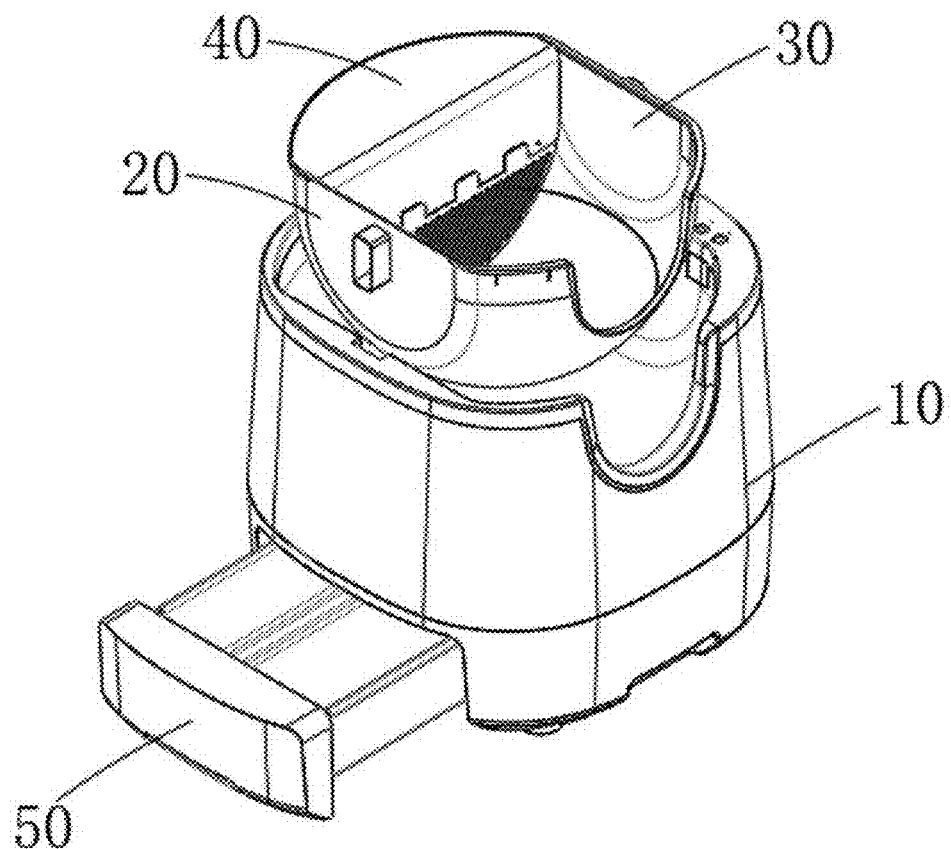
FIG. 12 is an overall exploded structural schematic view of a second structure of a pet toilet according to the present disclosure.
Figure 13:
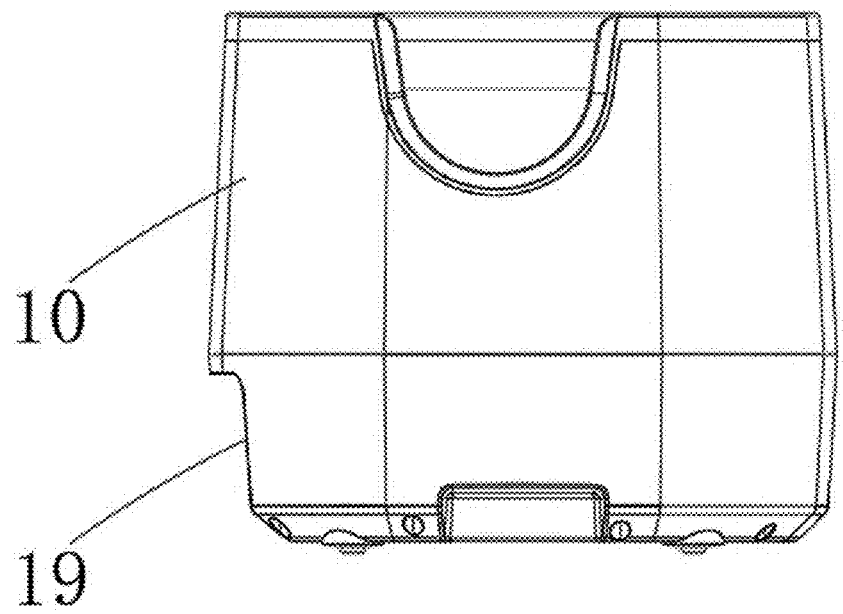
FIG. 13 is a front view of a main body in a second structure of a pet toilet according to the present disclosure.
Figure 14:
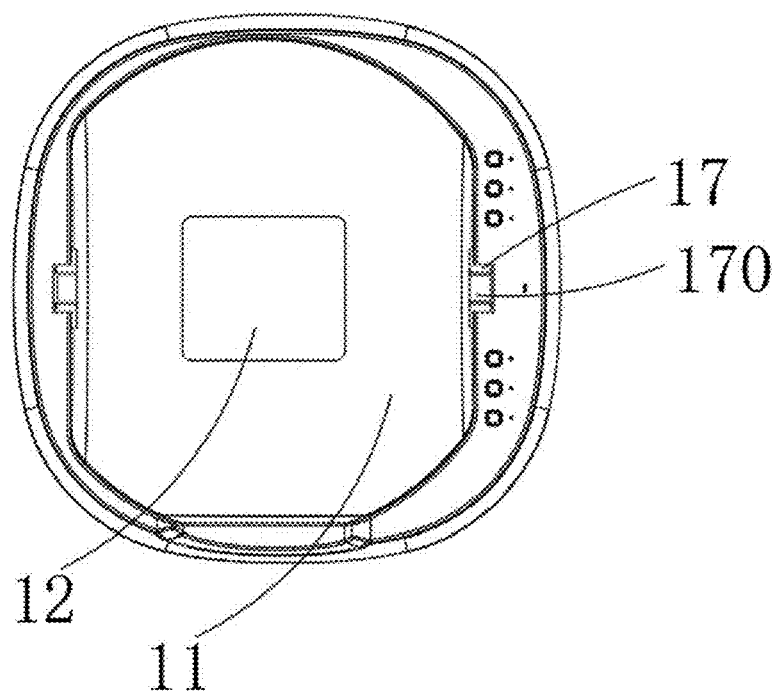
FIG. 14 is a top view of a main body in a second structure of a pet toilet according to the present disclosure.
Figure 15:
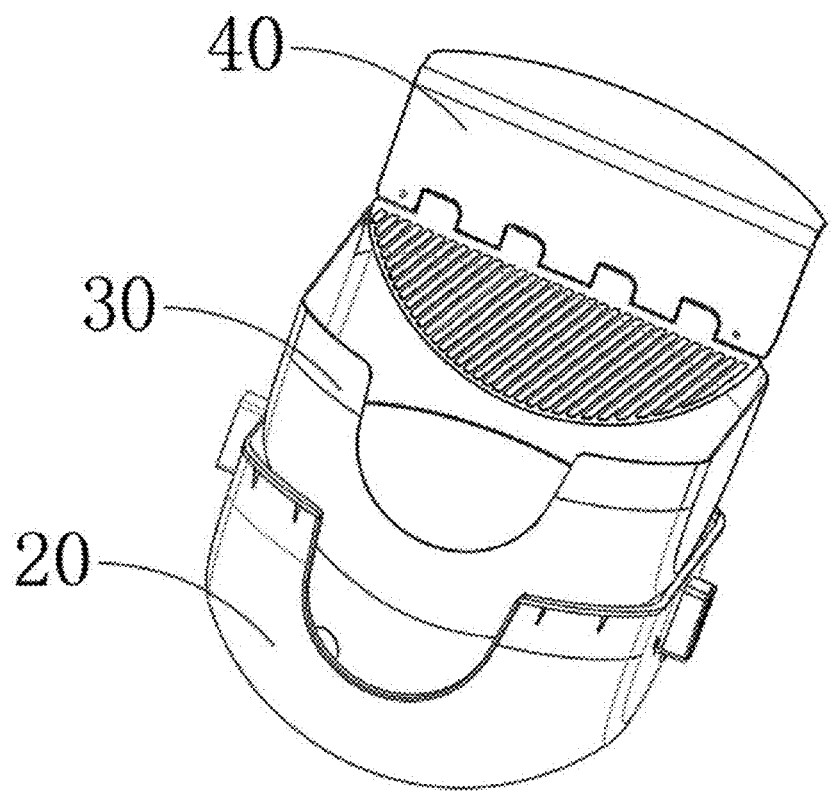
FIG. 15 is an exploded structural schematic view of a separation body, an inner liner, and a screen assembly in a second structure of a pet toilet according to the present disclosure.
Figure 16:
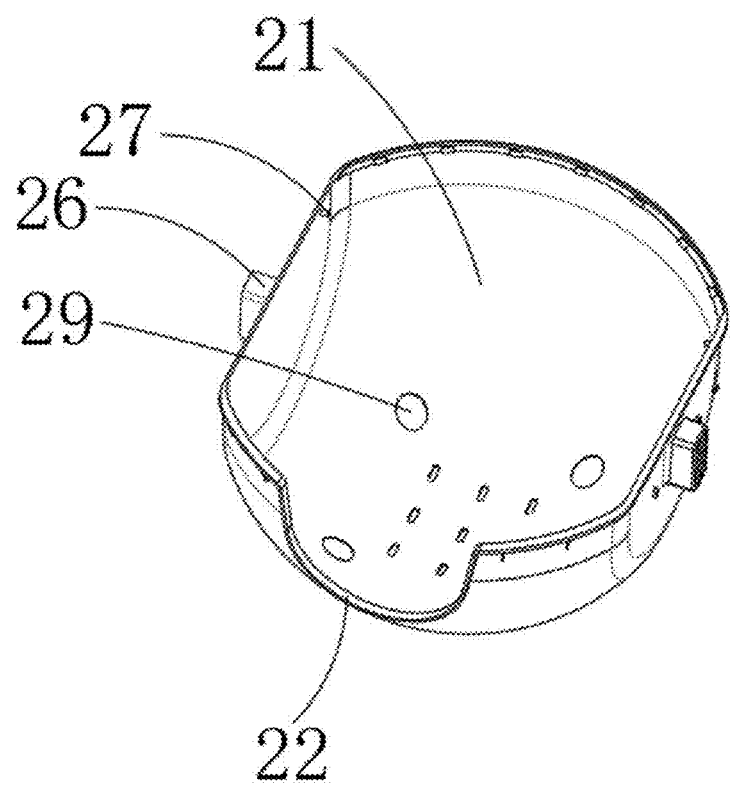
FIG. 16 is a structural schematic view of a separation body in a second structure of a pet toilet according to the present disclosure.

Referring to FIG. 4 or FIG. 13, in some embodiments, the main body 10 is arranged with a bin compartment 19 below, and the bin compartment 19 is in communication with the first accommodating space 11 through the discharge port 12.

In particular, the clumps of pet litter that wrap the waster of the pet, which have been screened out from the separation body 20, enter the bin compartment 19 through the discharge port 12.

Referring to FIG. 1 to 2 or 11 to 12, in some embodiments, the pet toilet further includes a waste bin 50, which is slidably arranged below the main body 10 and is disposed at the position of the bin compartment 19.

In particular, the waste bin 50 is slidably arranged on the main body 10 in a pull-push manner, and the clumps of pet litter that wrap the waster of the pet, which have been screened out from the separation body 20, are fed into the bin compartment 19 from the discharge port 12 and fall into the waste bin 50.

Figure 17:
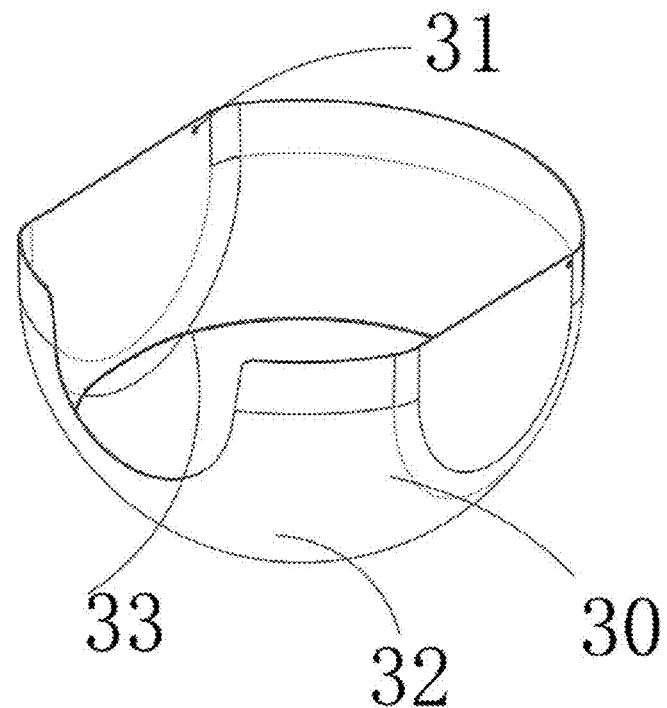
FIG. 17 is a structural schematic view of an inner liner in a second structure of a pet toilet according to the present disclosure.
Figure 18:
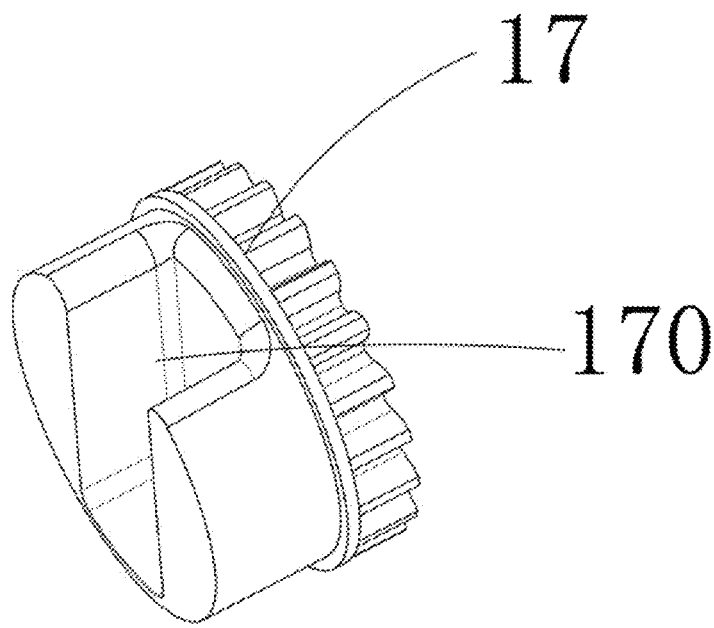
FIG. 18 is a structural schematic view of a second drive shaft in a second structure of a pet toilet according to the present disclosure.

Referring to FIG. 1 or FIG. 17, in some embodiments, an inner surface of the inner liner 30 is arranged with a guide line 33.

The guide line 33 can indicate the maximum amount of pet litter to be added, thereby preventing excessive addition of pet litter.

In addition, no gear transmission structure is provided on the separation body 20 of the present disclosure, and the drive mechanism engaging with the drive shaft (first drive shaft 14 or second drive shaft 17) is arranged inside the main body 10. The structures supporting and stabilizing the rotation movement of the separation body 20 are arranged on both ends of the separation body 20, such that the first accommodating space 11 of the main body 10 is not required to be opened or grooved for any transmission gear and supporting structure. Therefore, the trash and dust coming out of the separation body 20 cannot enter the interior of the main body 10 and can only enter the waste bin 50 through the discharge port 12.

Working principle: In the initial state of the pet toilet, the first and second litter bins are both filled with pet litter. The second litter bin is opened facing upward. When the pet needs to go to the toilet, the pet enters the second litter bin from the toilet entrance. When the pet has finished using the toilet, a sensor system of the pet toilet senses that there is excrement on the inner surface of the inner liner 30 in the second litter bin, and the pet toilet starts the drive mechanism in the main body to make the drive shaft (first drive shaft 14 or second drive shaft 17) drives the separation body 20 to rotate back and forth in the first accommodating space 11, such that the clean pet litter can enter the first litter bin through the multiple perforations 43 under the back and forth rotation of the separation body 20, while the pet litter that wraps the pet excrement is screened out of the second litter bin by the baffle 41 and the perforated plate 42 and then falls into the waste bin 50 in the bin compartment 19 through the discharge port 12. When it is necessary to clean the inside of the pet toilet, the screen assembly 40, the inner liner 30, and the separation body 20 can be detached in sequence, for replacing the inner liner 30 and wiping the screen assembly 40. After cleaning, the separation body 20, the inner liner 30 and the screen assembly 40 can be mounted back in sequence.

In summary, the present disclosure provides a pet toilet, including a main body 10, a separation body 20, an inner liner 30, and a screen assembly 40. The main body 10 has a first accommodating space 11 facing upwards and defines a discharge port 12 and a first inlet 13 that are each in communication with the first accommodating space 11. The discharge port 12 is disposed below the first accommodating space 11, and the first inlet 13 is disposed on a side wall of the main body 10. The separation body 20 is an open bowl-shaped structure, and the separation body 20 is rotatably and detachably arranged on the main body 10. The separation body 20 is disposed and rotatable in the first accommodating space 11. The separation body 20 has a second accommodating space 21 and defines a second inlet 22 that is in communication with the second inlet 22, where the first inlet 13 and the second inlet 22 are in a same direction to form a toilet entrance. A shape of the inner liner 30 is the same as a shape of the separation body 20, the inner liner 30 is detachably arranged on the separation body 20, and an outer surface of the inner liner 30 completely covers an inner surface of the second accommodating space 21. A lower part of the screen assembly 40 is arranged in the second accommodating space 21, dividing the second accommodating space 21 into a first litter bin and a second litter bin. An upper part of the screen assembly 40 extends perpendicular to the lower part of the screen assembly 40, and the upper part of the screen assembly 40 is detachably arranged on the separation body 20, such that an upper part of the first litter bin is closed, and the toilet entrance is in communication with the second litter bin. The separation body 20 and the inner liner 30 in the present disclosure are each adopted with an open bowl-shaped structure, such that the user can easily remove the separation body 20 from the main body 10, and then remove the inner liner 30 and the screen assembly 40 from the separation body 20 to replace the inner liner 30 and clean the screen assembly 40, thereby easily completing the cleaning work. Therefore, the present disclosure solves the defect of the existing pet toilet, where its interior is inconvenient to clean.

It should be noted that not all of the steps and modules in the above-mentioned flow charts and system structure diagrams are necessary, and some steps or modules may be omitted according to actual needs. The order of execution of the steps is not fixed and can be adjusted as needed. The system structure described in the above embodiments can be a physical structure or a logical structure, that is, some modules may be implemented by the same physical entity, or some modules may be implemented by multiple physical entities, or some modules may be implemented by some components of multiple independent devices.

In the above embodiments, the hardware modules may be implemented mechanically or electrically. For example, a hardware module may include a permanently dedicated circuit or logic (such as a dedicated processor, FPGA or ASIC) to perform the corresponding operation. The hardware module may include programmable logic or circuit (such as a general-purpose processor or other programmable processor) that can be temporarily configured by software to perform the corresponding operation. The specific implementation method (mechanical, or dedicated permanent circuit, or temporarily configured circuit) can be determined based on cost and time considerations.

The present disclosure is shown and explained in detail by the above drawings and embodiments, however, the present disclosure is not limited to these disclosed embodiments. Based on the embodiments, those skilled in the art can know that more embodiments of the present disclosure can be obtained by combining the technical means in the above different embodiments, and these embodiments are also within the scope of the present disclosure.

The invention claimed is:

1. A pet toilet, comprising:
a main body, having a first accommodating space facing upwards and defining a discharge port and a first inlet that are each in communication with the first accommodating space; wherein the discharge port is disposed below the first accommodating space, and the first inlet is disposed on a side wall of the main body;
a separation body, of an open bowl-shaped structure; wherein the separation body is rotatably and detachably arranged on the main body; the separation body is disposed and rotatable in the first accommodating space; the separation body has a second accommodating space and defines a second inlet that is in communication with a first inlet; the first inlet and the second inlet are in a same direction to form a toilet entrance;
an inner liner; wherein a shape of the inner liner is the same as a shape of the separation body; the inner liner is detachably arranged on the separation body, and an outer surface of the inner liner completely covers an inner surface of the second accommodating space; and
a screen assembly; wherein a lower part of the screen assembly is arranged in the second accommodating space, dividing the second accommodating space into a first litter bin and a second litter bin; an upper part of the screen assembly extends perpendicular to the lower part of the screen assembly, and the upper part of the screen assembly is detachably arranged on the separation body; an upper part of the first litter bin is closed, and the toilet entrance is in communication with the second litter bin.

2. The pet toilet according to claim 1, wherein a first drive shaft is arranged on a side of the main body opposite to the first inlet; the first drive shaft is arranged in the first accommodating space, and the first drive shaft is engaged with a drive mechanism inside the main body for transmission; the first drive shaft defines a first mounting groove, and the main body is arranged with a support column and defines a pulley guide slot; the support column and the pulley guide slot are disposed in first accommodating space and are arranged close to first inlet;
a first connecting key is arranged on an outer surface of the separation body opposite to the second inlet, and the outer surface of the separation body defines a support column guide slot and is arranged with a pulley; the support column guide slot and the pulley are arranged close to the second inlet; the first connecting key is arranged in the first mounting groove, the support column is arranged in cooperation with the support column guide slot, and the pulley guide slot is arranged in cooperation with the pulley; the separation body is rotatable in the first accommodating space under a drive of the main body, and a rotation axis of the separation body is parallel to an entry direction of the toilet entrance.

3. The pet toilet according to claim 2, wherein an inner surface of the separation body is arranged with a plurality of first mounting columns, and the plurality of first mounting columns are disposed in the first accommodating space; the outer surface of the inner liner defines a plurality of first mounting holes, and the plurality of first mounting columns are arranged in a one-to-one correspondence with the plurality of first installation holes; or,
an adhesive point is arranged on an inner surface of the separation body, and the outer surface of the inner liner has a fitting surface; the separation body and the inner liner are bonded together through the adhesive point; or,
an inner surface of the separation body and the outer surface of the inner liner are bonded together by a double-sided adhesive tape.

4. The pet toilet according to claim 3, wherein the screen assembly comprises a baffle and a perforated plate;
an upper portion of the screen assembly is the baffle, and a lower portion of the screen assembly is the perforated plate; the baffle and the perforated plate are arranged perpendicular to each other; the baffle is detachably arranged on the separation body, and the perforated plate is arranged in the second accommodating space, dividing the second accommodating space into the first litter bin and the second litter bin; a lower end of the perforated plate defines a plurality of perforations.

5. The pet toilet according to claim 4, wherein the baffle is arranged with a plurality of snap fasteners, and the baffle is connected to the separation body through the plurality of snap fasteners; or,
the baffle is arranged with a plurality of first magnetic attraction points, and the separation body is arranged with a plurality of second magnetic attraction points; the baffle and the separation body are connected through the plurality of first magnetic attraction points and the plurality of second magnetic attraction points; or,
the baffle defines a plurality of second mounting holes, and the separation body is arranged with a plurality of second mounting columns corresponding to the plurality of second mounting holes on the baffle; the baffle and the separation body are connected through the plurality of second mounting holes being snapped to the plurality of second mounting columns.

6. The pet toilet according to claim 1, wherein a second drive shaft is arranged on each of opposite sides of the main body, and two the second drive shafts are disposed in the first accommodating space and are both adjacent to the first inlet; each of the two second drive shafts is engaged with a drive mechanism inside the main body for transmission; each of the two second drive shafts defines a second mounting groove;
a second connecting key is arranged on an outer surface of the separation body on each of opposite sides, and two the second connecting keys are arranged adjacent to the second inlet; each of the two second connecting keys is arranged on a corresponding second drive shaft, and the separation body is rotatable in the first accommodating space under a drive of the main body; a rotation axis of the separation body is perpendicular to an entry direction of the toilet entrance.

7. The pet toilet according to claim 6, wherein an inner surface of the separation body is arranged with a plurality of first mounting columns, and the plurality of first mounting columns are disposed in the first accommodating space; the outer surface of the inner liner defines a plurality of first mounting holes, and the plurality of first mounting columns are arranged in a one-to-one correspondence with the plurality of first installation holes; or,
an adhesive point is arranged on an inner surface of the separation body, and the outer surface of the inner liner has a fitting surface; the separation body and the inner liner are bonded together through the adhesive point; or, an inner surface of the separation body and the outer surface of the inner liner are bonded together by a double-sided adhesive tape.

8. The pet toilet according to claim 7, wherein the screen assembly comprises a baffle and a perforated plate;

an upper portion of the screen assembly is the baffle, and a lower portion of the screen assembly is the perforated plate; the baffle and the perforated plate are arranged perpendicular to each other; the baffle is detachably arranged on the separation body, and the perforated plate is arranged in the second accommodating space, dividing the second accommodating space into the first litter bin and the second litter bin; a lower end of the perforated plate defines a plurality of perforations.

9. The pet toilet according to claim 8, wherein the baffle is arranged with a plurality of snap fasteners, and the baffle is connected to the separation body through the plurality of snap fasteners; or, the baffle is arranged with a plurality of first magnetic attraction points, and the separation body is arranged with a plurality of second magnetic attraction points; the baffle and the separation body are connected through the plurality of first magnetic attraction points and the plurality of second magnetic attraction points; or, the baffle defines a plurality of second mounting holes, and the separation body is arranged with a plurality of second mounting columns corresponding to the plurality of second mounting holes on the baffle; the baffle and the separation body are connected through the plurality of second mounting holes being snapped to the plurality of second mounting columns.

10. The pet toilet according to claim 1, wherein the main body is arranged with a bin compartment below, and the bin compartment is in communication with the first accommodating space through the discharge port.

11. The pet toilet according to claim 10, wherein the pet toilet further comprises a waste bin slidably arranged below the main body and disposed at a position of the bin compartment.

12. The pet toilet according to claim 1, wherein an inner surface of the inner liner is arranged with a guide line.

* * * * *